US009015395B2

(12) United States Patent
Barclay et al.

(10) Patent No.: US 9,015,395 B2
(45) Date of Patent: Apr. 21, 2015

(54) METHODS AND APPARATUSES FOR MULTIPLE PRIORITY ACCESS IN A WIRELESS NETWORK SYSTEM

(75) Inventors: Deborah Barclay, Winfield, IL (US); Alessio Casati, West Molesey (GB)

(73) Assignee: Alcatel Lucent, Boulogne-Billancourt (FR)

( * ) Notice: Subject to any disclaimer, the term of this patent is extended or adjusted under 35 U.S.C. 154(b) by 320 days.

(21) Appl. No.: 13/468,616

(22) Filed: May 10, 2012

(65) Prior Publication Data

US 2013/0304956 A1 Nov. 14, 2013

(51) Int. Cl.
*G06F 13/22* (2006.01)
*H04W 8/06* (2009.01)
*H04W 4/00* (2009.01)
*H04W 8/18* (2009.01)

(52) U.S. Cl.
CPC ............... *H04W 8/06* (2013.01); *H04W 4/005* (2013.01); *H04W 8/18* (2013.01)

(58) Field of Classification Search
CPC ...... H04L 47/14; H04W 60/00; H04W 48/16; H04W 60/005; H04W 4/005; H04W 76/025
USPC ......................................................... 710/220
See application file for complete search history.

(56) References Cited

U.S. PATENT DOCUMENTS

| | | | | |
|---|---|---|---|---|
| 8,565,689 | B1 * | 10/2013 | Rubin et al. | 455/67.11 |
| 8,588,792 | B2 * | 11/2013 | Lee et al. | 455/445 |
| 8,670,339 | B2 * | 3/2014 | Diachina et al. | 370/252 |
| 8,738,075 | B2 * | 5/2014 | Zhang et al. | 455/555 |
| 8,768,290 | B2 * | 7/2014 | Tiwari | 455/404.1 |
| 8,773,988 | B2 * | 7/2014 | Tiwari | 370/230 |
| 8,787,306 | B2 * | 7/2014 | Balasubramanian et al. | 370/331 |
| 2010/0034160 | A1 * | 2/2010 | Prakash et al. | 370/329 |
| 2010/0157887 | A1 * | 6/2010 | Kopplin | 370/328 |
| 2011/0086642 | A1 | 4/2011 | Lee et al. | |
| 2011/0195709 | A1 * | 8/2011 | Christensson et al. | 455/426.1 |
| 2012/0051235 | A1 * | 3/2012 | Kotecha et al. | 370/252 |
| 2012/0077456 | A1 * | 3/2012 | Tiwari | 455/404.1 |
| 2012/0106332 | A1 | 5/2012 | Tiwari | |
| 2012/0117140 | A1 * | 5/2012 | Wang et al. | 709/201 |

(Continued)

FOREIGN PATENT DOCUMENTS

CA 2787352 A1 10/2011

OTHER PUBLICATIONS

Vodafone: "Dual priority service for MS configured for NAS signalling low priority", 3GPP Draft; C1-120147-24008, 3rd Generation Partnership Project (3GPP), Mobile Competence Centre; 650, Route des lucioles; F-06921 Sophis-Antipolis Cedex; France, vol. CT WG1, no. Xiamen (P.R. China); 20120206-20120210, Jan. 30, 2012, XP050556471.
ZTE: "Proposals for handling dual priority issues", 3GPP Draft; S2-121346_Dual_Priority-R5, 3rd Generation Partnership Project (3GPP), Mobile Competence Centre; 650, Route des Lucioles; F-06921 Sophia-Antipolis Cedex; France, vol. SA WG2, no. Bratislava, Slovakia; 20120416-20120420, Apr. 11, 2012, XP050631869.
Qualcomm Incorporated: "Dual priority support", 3GPP Draft; S2-121519 23401-B10 Dual Priority, 3rd Generation Partnership Project (3GPP), Mobile Competence Centre; 650, Route des Lucioles; F-06921 Sophia-Antipolis Cedex; France, vol. SA WG2, no. Bratislava, Slovakia; 20120416-20120420, Apr. 11, 2012, XP050632017.
International Search Report dated Jul. 17, 2013 for related International Application No. PCT/US2013/039621.
International Preliminary Report dated Nov. 20, 2014.
Office Action for corresponding Taiwanese Application No. 102 116 072 dated Jan. 30, 2015.

*Primary Examiner* — Paul R Myers
(74) *Attorney, Agent, or Firm* — Harness, Dickey & Pierce

(57) ABSTRACT

In one embodiment, the method for registering to a wireless network includes transmitting a registration request from a device designated as having a low access priority. The registration request includes a value indicating that the device supports multiple access priorities. The multiple access priorities include the low access priority and at least one higher access priority. The method further includes requesting access when connecting to the wireless network based on a response to the registration request.

16 Claims, 5 Drawing Sheets

(56) References Cited

U.S. PATENT DOCUMENTS

| | | | |
|---|---|---|---|
| 2012/0275391 A1* | 11/2012 | Cui et al. | 370/329 |
| 2012/0294146 A1* | 11/2012 | Wu | 370/230 |
| 2012/0295568 A1* | 11/2012 | Tiwari | 455/404.1 |
| 2012/0329455 A1* | 12/2012 | Norp et al. | 455/433 |
| 2013/0005387 A1* | 1/2013 | Aso et al. | 455/517 |
| 2013/0042011 A1* | 2/2013 | Sugizaki et al. | 709/227 |
| 2013/0051326 A1* | 2/2013 | Jeyatharan et al. | 370/328 |
| 2013/0182607 A1* | 7/2013 | Kim et al. | 370/254 |
| 2013/0201870 A1* | 8/2013 | Gupta | 370/254 |
| 2013/0203399 A1* | 8/2013 | Gupta | 455/418 |
| 2013/0288693 A1* | 10/2013 | Dai et al. | 455/450 |
| 2013/0301547 A1* | 11/2013 | Gupta et al. | 370/329 |

\* cited by examiner

METHODS AND APPARATUSES FOR MULTIPLE PRIORITY ACCESS IN A WIRELESS NETWORK SYSTEM

BACKGROUND

As the demand for mobile broadband access continues to increase, especially with the use of wireless technologies for Machine to Machine (M2M) communication, there exists a need for further improvements in wireless technologies such as, but not limited to, Long Term Evolution (LTE) and Universal Mobile Telecommunications System (UMTS) technologies. Third Generation Partnership Project (3GPP) Release 11 is part of a wireless industry effort to provide these further improvements.

In current and previous releases of 3GPP LTE, mobile devices may be classified as being configured for low access priority. Devices configured for low access priority operate with reduced priority when accessing a wireless network relative to other devices with a higher access priority. During periods of congestion, a network may reject or restrict requests for network access from low access priority devices while still allowing access to normal and high priority requests. Devices configured for low access priority operate under low access priority unless special normal or high priority access is granted. For example, special priority access may be granted to low access priority devices for emergency calls or Mobile Priority Service (MPS).

It may be desirable for some low access priority devices to be able to operate in a normal access priority mode in certain additional situations. For example, a device that typically operates with low access priority may have an application or event that needs to be reported to an application server using normal access priority mode. For example an application on the device that sends hourly or daily usage reports can send them using low access priority, and would use normal access priority to send high priority information such as information that the unit (e.g., utility box or vending machine) is being tampered or the resource is getting low (e.g., candy or soda). In order to allow normal access priority, these low access priority devices need to be configured for dual access priority capability.

Among other enhancements, it has been proposed that 3GPP Rel 11 provide dual access priority capability for devices and networks. However, there is concern that low access priority devices may abuse dual access priority capability.

SUMMARY

Embodiments relate to a method and/or device for accessing a wireless network and a method and/or apparatus for controlling use of priority access to a wireless network.

In one embodiment, the method for accessing a wireless network includes transmitting a registration request from a device designated as having a low access priority. The registration request includes a value indicating that the device supports multiple access priorities. The multiple access priorities include the low access priority and at least one higher access priority. The method further includes requesting access when connecting to the wireless network based on a response to the registration request In one embodiment, the response to the registration request indicates whether the wireless network permits multiple access priorities.

The method may further include requesting, by the device, a low access priority service connection from the wireless network if the response to the registration request indicates that the wireless network does not permit multiple access priorities for the device.

In one embodiment, the method further includes selectively requesting, by the device, a service connection at the higher access priority if the response to the registration request indicates that the wireless network permits multiple access priorities.

In at least one embodiment, the method further includes receiving the response to the registration request.

In one embodiment, the method for controlling priority access to a wireless network includes receiving a registration request from a device designated as having a low access priority. The registration request includes a value indicating that the device supports multiple access priorities. The multiple access priorities include the low access priority and at least one higher access priority. The method further includes determining whether to permit a service connection to the device under the higher access authority. The method further includes transmitting a response to the registration request based on the determining.

In one embodiment, the determining of a service connection is based on a congestion level of at least one cell of the wireless network.

In one embodiment, the determining service connection is based on a core network congestion level of the wireless network.

In one embodiment, the response indicates that the higher access priority is not permitted for the device if the determining determines to not permit a service connection to the device under the higher access priority.

The method may further include receiving a service request requesting service at the higher access priority. The method may further include selectively granting the higher access priority for at least a duration required to respond to the service request. The method may further include implementing a price control for the duration required to respond to the service request.

In one embodiment, a device for registering to a wireless network includes a processor and an associated memory. The processor is configured to transmit a registration request. The registration request includes a value indicating that the device is designated as having a low access priority and that the device supports multiple access priorities. The multiple access priorities include the low access priority and at least one higher access priority. The processor is further configured to request access to the wireless network based on a response to the registration request.

In one embodiment, the response to the registration request indicates whether the wireless network permits multiple access priorities.

In one embodiment, the processor is further configured to request only low priority service from the wireless network if the response to the registration request indicates that the wireless network does not permit multiple access priorities for the device.

In one embodiment, the processor is further configured to selectively request a service connection from the wireless network at the higher access priority level if the response to the registration request indicates that the wireless network permits the device to have multiple access priorities.

In one embodiment, the processor is further configured to receive the response to the registration request.

In one embodiment, an apparatus for controlling usage of priority access to a wireless network includes a processor and an associated memory. The processor is configured to receive a registration request from a device designated as having a low access priority. The registration request includes a value indicating that the device supports multiple access priorities. The multiple access priorities include the low access priority and at least one higher access priority. The processor is further configured to determine whether to permit a service connection to the device under the higher access priority. The processor is further configured to transmit a response based on the determining.

In one embodiment, the determining is based on a congestion level of at least one cell of the wireless network.

In one embodiment, the determining is based on a core network congestion level of the wireless network.

In one embodiment, the response indicates that the higher access priority service connection is not permitted for the device if the determining determines to not permit a service connection to the device under the higher access priority.

In one embodiment, the processor is further configured to receive a service request requesting service at the higher access priority. The processor is further configured to selectively grant the higher access priority for at least a duration required to respond to the service request. The processor is further configured to implement a price control for the duration required to respond to the service request.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure, and wherein.

DETAILED DESCRIPTION OF EXAMPLE EMBODIMENTS

Figure 1:
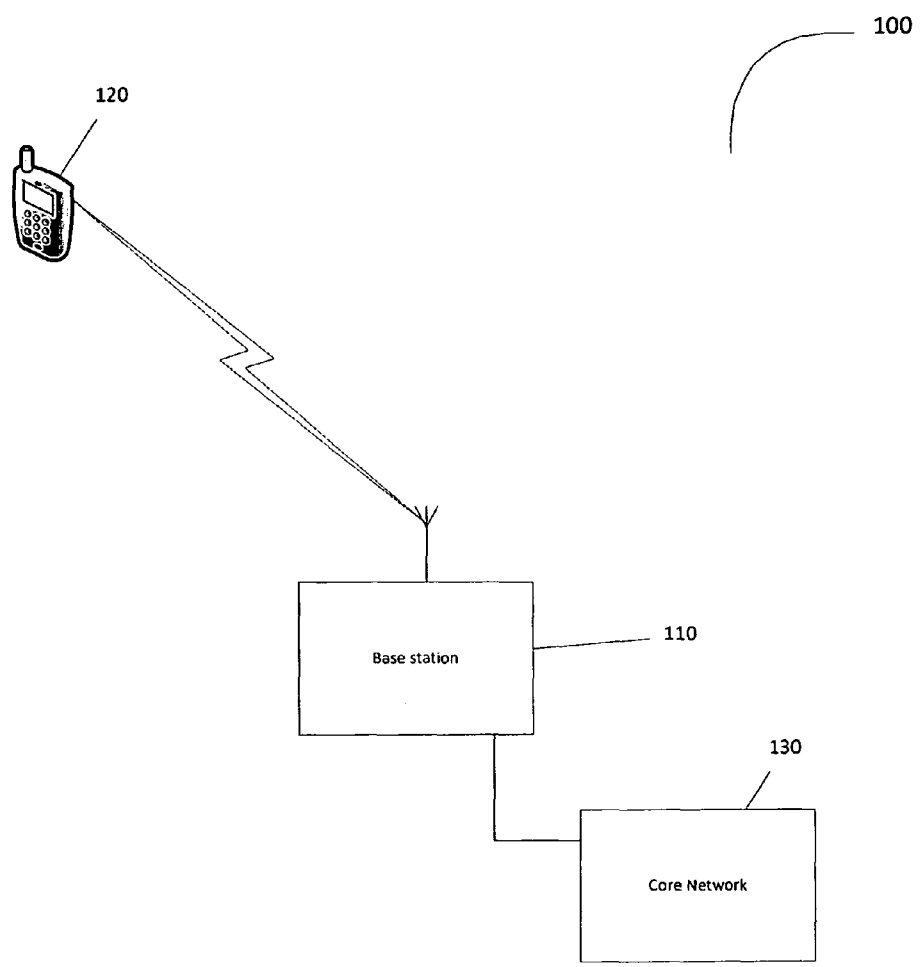
FIG. 1 illustrates a system in which example embodiments may be implemented.

Various embodiments of the present disclosure will now be described more fully with reference to the accompanying drawings. Like elements on the drawings are labeled by like reference numerals.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected,' or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Example embodiments may be utilized in conjunction with Radio Access Networks (RANs) such as: Worldwide Interoperability for Microwave Access (WiMAX); ultra mobile broadband (UMB); $3^{rd}$ Generation Partnership Project Long Term Evolution (3GPP LTE), etc.

In current wireless networks, a device may be classified as only being enabled for low access priority communications. Devices that support only low access priority communications may be prevented from accessing a wireless network during periods of congestion on at least one cell of that wireless network or congestion on the core network of the wireless network. However, low access priority devices may be granted higher priority access under special situations, for example, in an emergency.

Mobile network operators (MNOs) have requested that devices be provided with dual access priority capabilities, in the sense that the devices can operate under a normal access priority status in some situations, but under low access priority status in most situations. However, allowing dual access priority could lead to abuse in certain situations, and this could lead to exacerbation of network congestion or network failure due to denial of service attacks.

For example, if a network has not been upgraded to allow dual access priority capabilities, but devices supporting dual access priority are nevertheless available and operating in the non-upgraded network, the upgraded devices may appear to be attempting to access the network under an unauthorized priority status. The upgraded devices may therefore appear to be "misbehaving" devices from the point of view of the non-upgraded network, and these devices may therefore be denied any service, including low priority service, from the non-upgraded network. This situation may occur, for example, if upgraded devices are supported in dual access priority mode in their home networks, but roam into a non-upgraded network that does not support dual access priority.

Further, some MNOs may choose not to provide services to dual access priority devices on at least some of their networks because such devices may request higher access priority connections too often and thereby overload the relevant network. As is known, low access priority devices are typically only rejected for services when there are periods of congestion in the network. Therefore, if a great number of low access priority devices register as dual access priority devices and obtain higher access priority connections, network congestion may be exacerbated.

In example embodiments, a method is provided in which user devices supporting dual access priority check whether dual access priority is permitted or supported on networks to which the devices are requesting registration. In example embodiments, such a check is done before the devices attempt communication on a network, so that the devices do not appear to be "misbehaving" devices from the point of view of the network. If the device doesnot receive an indication of dual access priority support from the network, then the device must remain in a low access priority mode and request services only with low access priority.

FIG. 1 illustrates a system in which example embodiments are implemented. Referring to FIG. 1, communications network 100 includes at least one base station 110. At least one user equipment (UE) 120 is connected to the at least one base station 110. The at least one base station 110 is further connected to a Core Network (CN) 130. The CN elements include, for example, one or more Mobility Management Entities (MME). Though, for the purpose of simplicity, communications network 100 is illustrated as having only one base station 110, communications network 100 may have any number of base stations. The base station 110 serves a geographical region. It should be understood that there may be additional, adjacent base stations serving adjacent geographic regions.

The system 100 may include one or more UEs 120.

Figure 2:
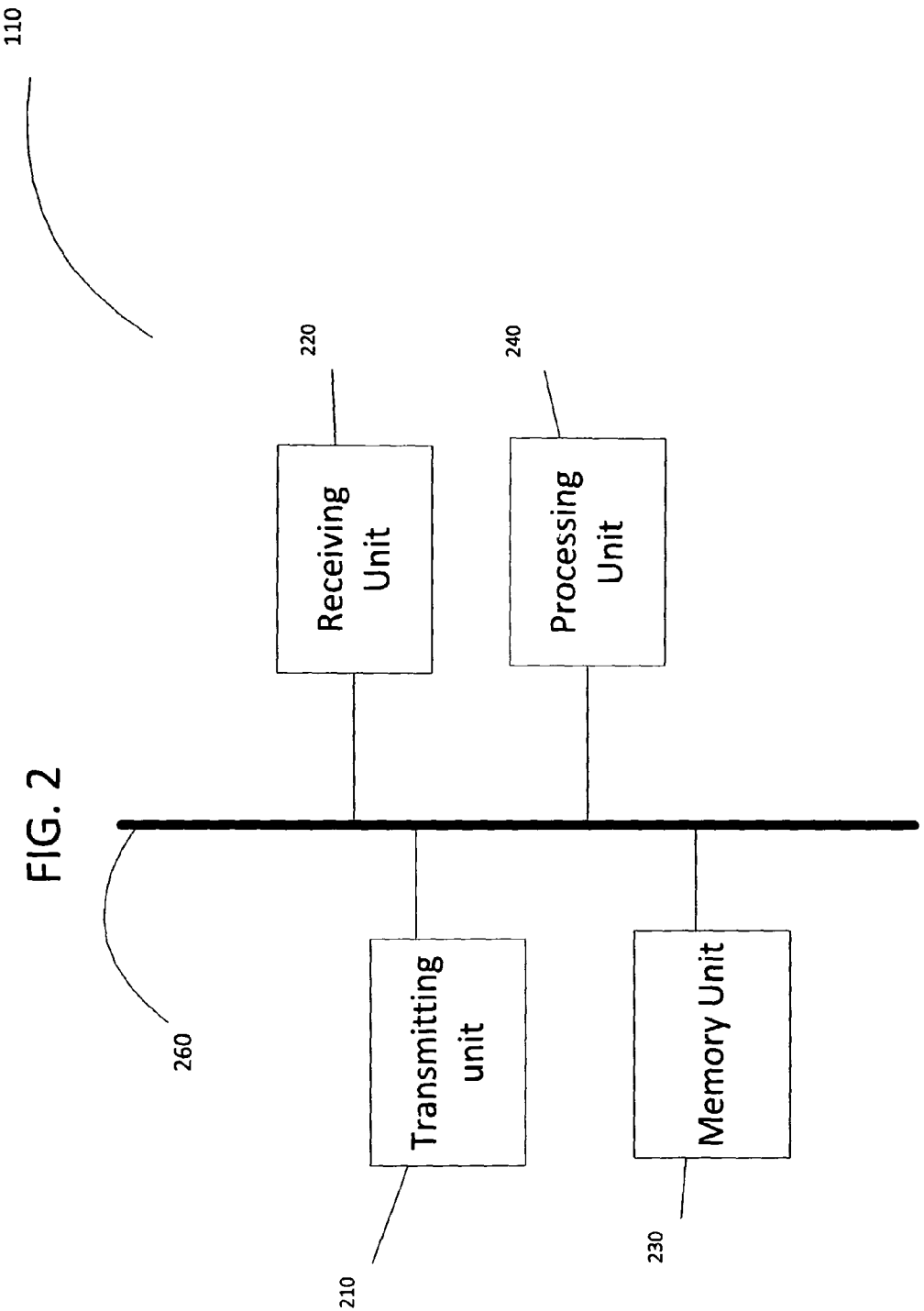
FIG. 2 illustrates a structure of a network element or a mobile device for implementing methods according to at least one example embodiment.

FIG. 2 is a diagram illustrating a structure of a UE 120 for implementing methods according to at least one example embodiment. The UE 120 may be any element that broadcasts to base stations 110 or CNs 130 connected to the wireless network.

The transmitting unit 210, receiving unit 220, memory unit 230, and processing unit 240 may send data to and/or receive data from one another using the data bus 260. The transmitting unit 210 is a device that includes hardware and any necessary software for transmitting wired and/or wireless signals including, for example, data signals and control signals, via one or more wired and/or wireless connections to network elements in the wireless communications network 100. For example, data signals transmitted by the transmitting unit 210 may include registration messages or service request messages for registering on a wireless network, for requesting services from the base station 110, or for providing location updates and other messages to the CN 130.

The receiving unit 220 is a device that includes hardware and any necessary software for receiving wired and/or wireless signals including, for example, data signals and control signals, via one or more wired and/or wireless connections to network elements in the wireless communications network 100.

The memory unit 230 may be any device capable of storing data including magnetic storage, flash storage, etc. The memory unit 230 may further store computer readable code.

The processing unit 240 may be any device capable of processing data including, for example, a microprocessor configured to carry out specific operations based on input data, or capable of executing instructions included in computer readable code stored on the memory unit 230.

It will be understood that a base station 110 and other network element such as a CN 130 includes similar, corresponding structures for transmitting signals to each other or to the UEs 120, and for receiving signals transmitted from the UEs 120. For example, the base station 110 and CN 130 include transmitting units 210 for transmitting responses to registration requests or mobility updates to the UEs 120, according to at least one example embodiment. The base station 110 and CN 130 further include receiving units 220 for receiving registration requests or mobility updates from the UEs 120 according to at least one example embodiment.

Aspects of the example embodiments provide methods for network elements 110, 130 to prevent low access priority UEs 120 supporting dual access priority from obtaining network services using a higher, or "normal," access priority. A network element 110, 130 may either not support dual access priority or the MNO may wish to not allow dual access priority on the corresponding network.

Further aspects of the example embodiments provide methods for network elements 110, 130 to provide network services under a normal access priority to low access priority UEs 120 that support dual access priority. Example embodiments for preventing and allowing low access priority UEs 120 from receiving services under normal access priority are described below with respect to FIG. 3.

Figure 3:
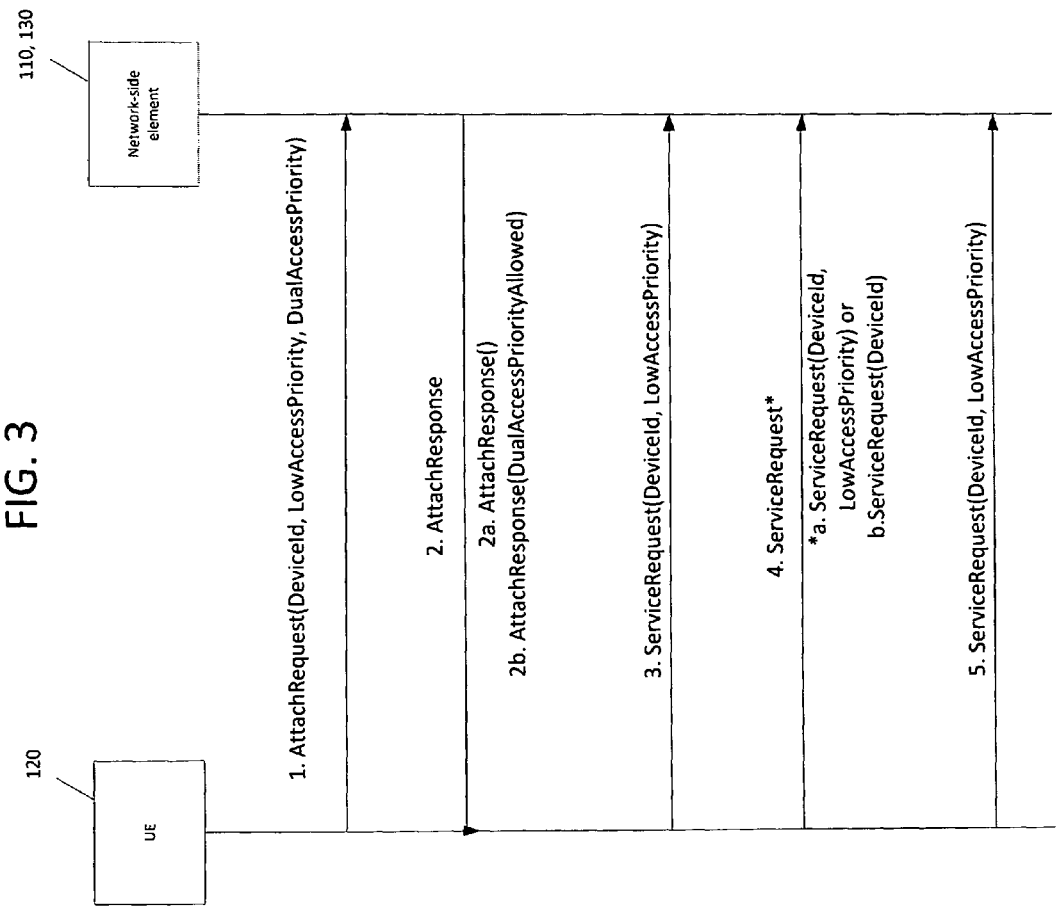
FIG. 3 illustrates signal flows for implementing methods according to an example embodiment.

Referring to FIG. 3, in at least one embodiment, the UE 120 transmits a message 1 requesting registration to a network. The registration message may be an AttachRequest message. In at least one embodiment, the UE 120 transmits the AttachRequest message to the base station 110. The AttachRequest message is described in more detail below with respect to FIG. 4.

In at least one other embodiment, the UE 120 transmits a message 1 to a CN 130 to perform mobility management procedures. In at least this embodiment, the UE 120 transmits a Tracking Area Update message, a Routing Area Update message, or a Location Area Update message to the CN 130 depending on the 3GPP access technology used in the network 100.

Figure 4:
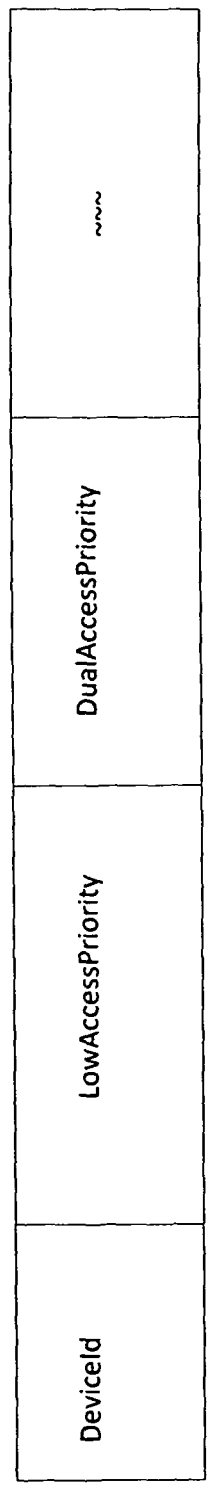
FIGS. 4, 5A, and 5B illustrate structures of messages for implementing methods according to some example embodiments.

Referring to FIG. 4, the AttachRequest message includes at least a parameter, DeviceId, which is an identifier of the UE 120 making the registration request. The AttachRequest message further includes a parameter, LowAccessPriority, which indicates that the UE 120 is a low access priority device. Further, the AttachRequest message includes at least a parameter, DualAccessPriority, which indicates that the UE 120 supports dual access priority. Dual access priority indicates that the UE 120 is a low access priority device that further supports a higher, "normal" access priority mode. It will be understood that similar parameters will be included if message 1 is one of a Tracking Area Update, Routing Area Update, Location Area Update or other mobility update message.

Referring again to FIG. 3, the network-side element in the wireless network is at least a base station 110 and CN 130. For example, the CN 130 processes the AttachRequest and sends the response to base station 110, and the base station 110 transmits a response in message 2 to the AttachRequest message. In at least one embodiment, the response is an AttachResponse message. In at least one other embodiment, the network-side element transmits a response message 2 to a Tracking Area Update, Routing Area Update, Location Area Update or other mobility update message.

The response message 2 may take one of two forms. If the network does not allow or has not been upgraded to support low access priority UEs 120 with dual access priority, the base station 110 and CN 130 completes the registration procedure or the mobility management procedure with the device, without indicating that the UE 120 is allowed to use dual access priority. If this is the case, the response message takes the form of message 2a in FIG. 3. If the network does allow low access priority UEs 120 to use dual access priority, the base station 110 and CN 130 complete the registration or mobility management procedure with the UE 120, by indicating that that the UE 120 is allowed to use dual access priority in the registration response or mobility management response message. In this case, the response message takes the form of message 2b, shown in FIG. 3.

After completion of the registration or mobility update process, the UE 120 may make any number of service connections using a low access priority mode according to message 3. The UE 120 will continue to make service requests using a low access priority mode according to message 3 until higher priority access is desired.

When the UE 120 wishes to access the network using normal priority, the UE 120 checks the registration response (response from Attach, Tracking Area Update . . . ) stored in its memory unit 230 to determine whether the network indicated support for dual access priority. For example, the UE 120 may check a value stored in memory unit 230, where the UE 120 saved the results of the registration procedure or the mobility update procedure, or where the UE 120 saved parameters returned in the attachment response or mobility management response of message 2.

Figure 5A:
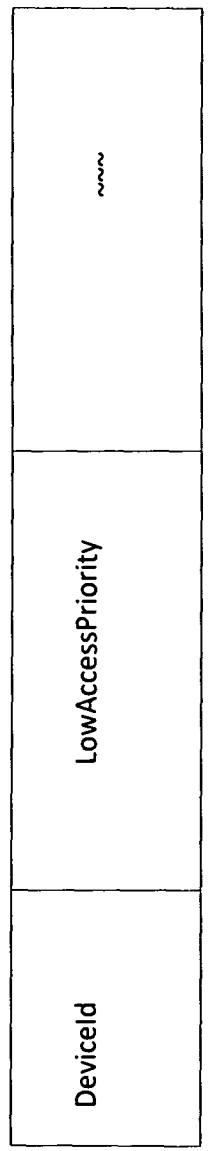

If the network element 110, 130 did not indicate support for dual access priority, the UE 120 must continue network access using the low access priority mode. Therefore, the UE 120 will send message 4a, indicating that the UE 120 wishes to receive services under low access priority. Message 4a according to an example embodiment may be a ServiceRequest message as shown in FIG. 5A. As shown in FIG. 5A, the ServiceRequest message 4a includes at least a parameter, DeviceId, that identifies the UE 120 making the service request. Further, the ServiceRequest message 4a includes a parameter, LowAccessPriority, that indicates that the UE 120 is making at least this service request while operating in low access priority.

The network 100 may experience elevated network congestion levels in which the network would otherwise have rejected low access priority service requests from the UE 120. In this case, in an example embodiment, service requests according to message 4a are rejected by the network 100. In at least one embodiment, the base station 110 may determine cell-level congestion levels. In at least one further embodiment, the CN 130 may determine a core network congestion level. Either the cell-level congestion level or core network congestion level may be used to indicate whether network 100 is experiencing elevated congestion levels.

Figure 5B:
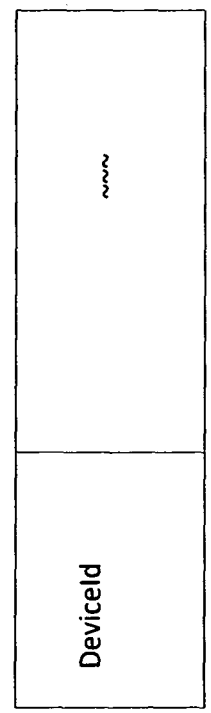

Referring again to FIG. 3, if the network element 110 or 130 indicated support for dual access priority, and the UE 120 wishes to send a service request under normal access priority, the UE 120 sends message 4b. In an example embodiment, the UE 120 sends a ServiceRequest message as shown in FIG. 5B. As shown, the ServiceRequest message 4b includes at least the parameter DeviceId, which identifies the UE 120 making the current service request. However, in contrast to message 4a, shown in FIG. 5A, message 4b does not include a parameter LowAccessPriority, because the UE 120 is requesting access under, for example, normal access priority. In this case, access will be provided to the network 100 according to normal, rather than low, access priority. Further, the UE 120 using normal access priority may be allowed access while other UEs 120 using low access priority are not permitted any access to the network. The UE 120 may subsequently make future service requests with low access priority according to message 5. Further, the UE 120 may alternate between normal and low access priority requests according to the needs of the UE 120. Each time that the UE 120 requests a service connection, the network elements 110, 130 will determine the level of congestion on the network and will grant or deny access on a case-by-case basis.

In example embodiments, when the network-side element 110, 130 responds to the registration request or mobility update message 1 by indicating that dual access priority devices will not be supported, the UE 120 may nevertheless attempt connections using normal access priority according to message 4*b*. In this case, in at least one embodiment, the network-side element 110, 130 may implement price controls such that the UE 120 is permitted access, but at a premium service fee.

According to example embodiments, therefore, methods are provided for permitting normal access priority messaging from user devices that normally receive only low access priority. Normal access priority may therefore be used for certain types of transmissions according to the needs of user devices, subject to restrictions based on network congestion or mobile network operator preferences or policies. Normal access priority may further be provided to low access priority devices at a premium service charge.

Illustrative embodiments described herein are directed methods in which two access priorities, low and normal, are supported. However, it will be understood that more than two access priorities may be supported in additional example embodiments. For example, a high access priority may be supported for service requests.

Variations of the example embodiments are not to be regarded as a departure from the spirit and scope of the example embodiments, and all such variations as would be apparent to one skilled in the art are intended to be included within the scope of this disclosure.

What is claimed:

1. A method for accessing a wireless network, the method comprising:
   transmitting a registration request from a device, the registration request including a first value designating the device as having a low access priority and a second value indicating that the device supports multiple access priorities when accessing the wireless network, the multiple access priorities including the low access priority and at least one higher access priority;
   receiving, at the device, a response from the wireless network, the response indicating whether the wireless network supports the multiple access priorities by devices designated as having the low access priority; and
   requesting, by the device, access to the wireless network using one of the low access priority or the at least one higher access priority, based on the response to the registration request.

2. The method of claim 1, further comprising:
   requesting, by the device, a low access priority service connection from the wireless network if the response to the registration request indicates that the wireless network does not permit multiple access priorities for the device.

3. The method of claim 2, further comprising:
   selectively requesting, by the device, a service connection at the at least one higher access priority if the response to the registration request indicates that the wireless network permits the device to have multiple access priorities.

4. A method for controlling priority access to a wireless network, the method comprising:
   receiving a registration request from a device, the registration request including a first value designating the device as having a low access priority and a second value indicating that the device supports multiple access priorities when accessing the wireless network, the multiple access priorities including the low access priority and at least one higher access priority;
   determining whether to permit a service connection to the device under the multiple access priorities; and
   transmitting a response to the registration request based on the determining, the response indicating whether the wireless network permits a service connection under the multiple access priorities by devices designated as having the low access priority.

5. The method of claim 4, wherein the determining is based on a congestion level of at least one cell of the wireless network.

6. The method of claim 5, wherein the determining is based on a core network congestion level of the wireless network.

7. The method of claim 4, wherein the response indicates that the higher access priority is not permitted for the device if the determining determines to not permit a service connection to the device under the multiple access priorities.

8. The method of claim 7, further comprising:
   receiving a service request requesting service at the at least one higher access priority if the determining determines to permit a service connection under the multiple access priorities.,
   selectively granting the at least one higher access priority for at least a duration required to respond to the service request; and
   implementing a price control for the duration required to respond to the service request.

9. A device for accessing a wireless network, the device comprising:
   a processor and an associated memory, the processor configured to,
      transmit a registration request from a device, the registration request including a first value designating the device as having a low access priority and a second value indicating that the device supports multiple access priorities when accessing the wireless network, the multiple access priorities including the low access priority and at least one higher access priority,
      receive a response from the wireless network, the response indicating whether the wireless network supports the multiple access priorities by devices designated as having the low access priority, and
      request access to the wireless network using one of the low access priority or the at least one higher access priority, based on the response to the registration request.

10. The device of claim 9, wherein the processor is further configured to:
    request only low priority service from the wireless network if the response to the registration request indicates that the wireless network does not permit multiple access priorities for the device.

11. The device of claim 10, wherein the processor is further configured to:
    selectively request a service connection from the wireless network at the at least one higher access priority if the response to the registration request indicates that the wireless network permits the device to have multiple access priorities.

12. An apparatus for controlling usage of priority access to a wireless network, the apparatus comprising:

a processor and an associated memory, the processor configured to, receive a registration request from a device, the registration request including a first value designating the device as having a low access priority and a second value indicating that the device supports multiple access priorities when accessing the wireless network, the multiple access priorities including the low access priority and at least one higher access priority, determine whether to permit a service connection to the device under the multiple access priorities, and transmit a response based on the determining, the response indicating whether the wireless network permits a service connection under the multiple access priorities by devices designated as having the low access priority.

13. The apparatus of claim 12, wherein the determining is based on a congestion level of at least one cell of the wireless network.

14. The apparatus of claim 13, wherein the determining is based on a core network congestion level of the wireless network.

15. The apparatus of claim 12, wherein the response indicates that the higher access priority is not permitted for the device if the determining determines to not permit a service connection to the device under the multiple access priorities.

16. The apparatus of claim 15, wherein the processor is further configured to:

receive a service request requesting service at the higher access priority if the determining determines to permit a service connection under the multiple access priorities selectively grant the at least one higher access priority for at least a duration required to respond to the service request; and implement a price control for the duration required to respond to the service request.

* * * * *